United States Patent [19]

Heian et al.

[11] 4,120,645

[45] Oct. 17, 1978

[54] SYSTEM FOR HANDLING HIGH SULFUR MATERIALS

[75] Inventors: Glenn A. Heian, Franklin, Wis.; Robert F. Kohl, Tucson, Ariz.

[73] Assignee: Allis-Chalmers Corporation, Milwaukee, Wis.

[21] Appl. No.: 762,980

[22] Filed: Jan. 27, 1977

Related U.S. Application Data

[62] Division of Ser. No. 576,995, May 13, 1975, Pat. No. 4,065,320.

[51] Int. Cl.² .............................................. F27B 7/02
[52] U.S. Cl. .................................. 432/106; 106/102; 423/244; 432/14
[58] Field of Search .................. 423/244; 432/106, 14; 106/102

[56] References Cited

U.S. PATENT DOCUMENTS

| | | | |
|---|---|---|---|
| 2,718,453 | 9/1955 | Beckman | 423/244 |
| 3,343,908 | 9/1967 | Wickert | 423/244 |
| 3,653,645 | 4/1972 | Heian | 106/102 |
| 3,782,888 | 1/1974 | Cnare | 432/14 |
| 3,920,380 | 11/1975 | Heian | 432/106 |
| 3,986,819 | 10/1976 | Heian | 432/14 |
| 4,047,884 | 9/1977 | Heian | 106/102 |

Primary Examiner—John J. Camby
Attorney, Agent, or Firm—Robert C. Jones

[57] ABSTRACT

Sulfur oxides have a strong affinity for free lime and readily form gypsum anhydrite. By utilizing 2200° F or higher on-gas containing reduced quantities of sulfur to the preheat zone of a material treating apparatus, large quantities of sulfur can be removed from gases evolved in the rotary kiln. Utilizing lower sulfur content on-gas to preheat will substantially improve the ability of the system to lower both sulfur and alkali levels in the clinker. Substantially free lime in the form of fines is introduced into the kiln off-gas stream to form gypsum anhydrite which is removed and has the potential to be utilized as a by-product. Essentially all of the remaining gaseous sulfur that has not been absorbed by the lime bearing dust is absorbed by the free lime in the pellets in the preheat zone of a material treating apparatus.

16 Claims, 7 Drawing Figures

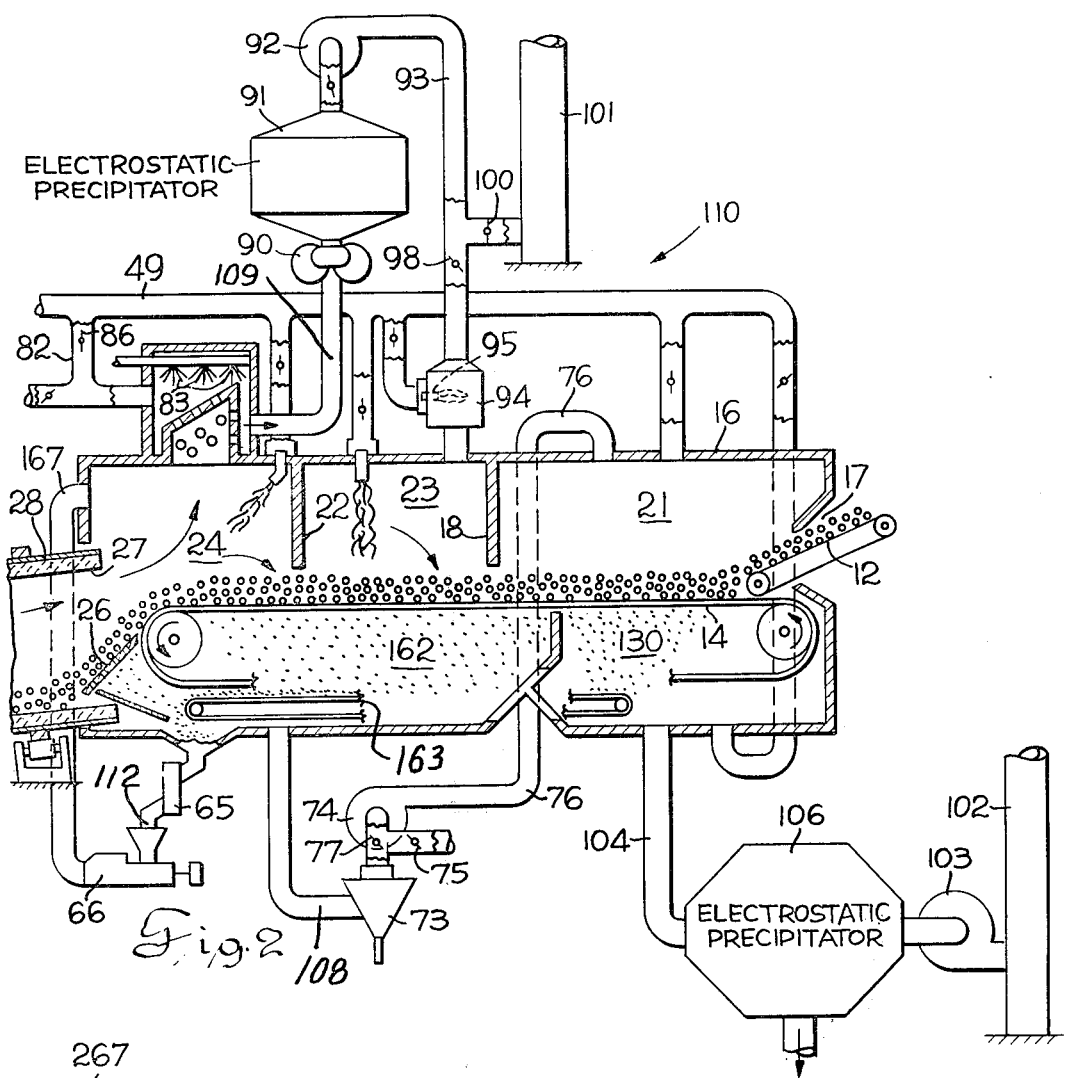
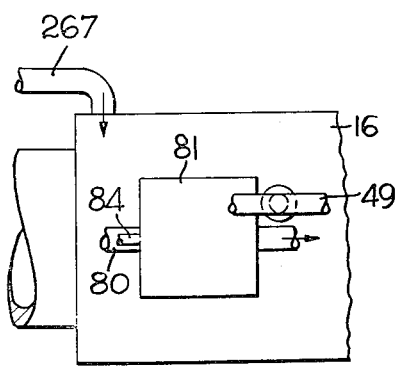
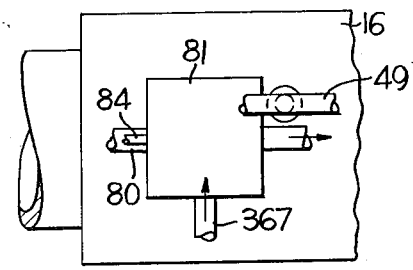
Fig. 2
Fig. 3
Fig. 4

SYSTEM FOR HANDLING HIGH SULFUR MATERIALS

This is a division, of application Ser. No. 576,995, filed May 13, 1975, now U.S. Pat. No. 4,065,320.

BACKGROUND OF THE INVENTION

The present invention relates to treating material and more specifically to a method and apparatus for processing high sulfur and high alkali kiln dust.

Material treating systems such as a cement material treating system results in the generation of tremendous amounts of gaseous material and dust particles which must be controlled in some manner. This gaseous material and dust cannot be allowed to escape to the atmosphere as it creates an environmental problem which is not tolerable in our present society. The physical operation of collecting the relative fine dust also presents problems. Also, once the dust is collected, disposal of the collected dust presents the additional problem of disposal. A solution for the dust problem is to cycle the dust back through an improved grate kiln system to utilize the dust for improving the abrasion resistance of the pellets. This is feasible by collecting the dust carried by the off-gas from a kiln system and dusting the pellets forming in the pelletizer or blending the dust with the raw material. Another solution for the gas and dust problem is to convert the undesirable gaseous material to a solid state dust form and remove the dust from the system.

A general object of the present invention is to provide a method and apparatus to process material having a high sulfur content which may include a high alkali content.

Still another object of the invention is to provide a method and apparatus wherein waste kiln dust may be utilized to increase the abrasive resistance of pellets processed through the treating system.

Yet another object of the present invention is to provide a method and apparatus for utilizing kiln dust as an additive to or during the agglomeration without adding ingredients to the dust to produce a more highly abrasion resistant pellet.

A further object of the present invention is to provide a method for reacting high sulfur content kiln off-gases with lime to form gypsum anhydrite which is readily collected and has the potential to be utilized as a by-product.

DESCRIPTION OF THE DRAWINGS

FIG. 2 is a fragmentary view of the material treating apparatus of FIG. 1 showing a modification thereof;

FIG. 3 is a fragmentary plan view of the mixing box shown in FIG. 1 showing a modification for supplying dust to the kiln off-gases in the preheat zone;

FIG. 4 is a fragmentary plan view of the mixing box of FIG. 3 showing still another modification for supplying dust to the kiln off-gases in the preheat zone;

Description of the Apparatus

Figure 1:
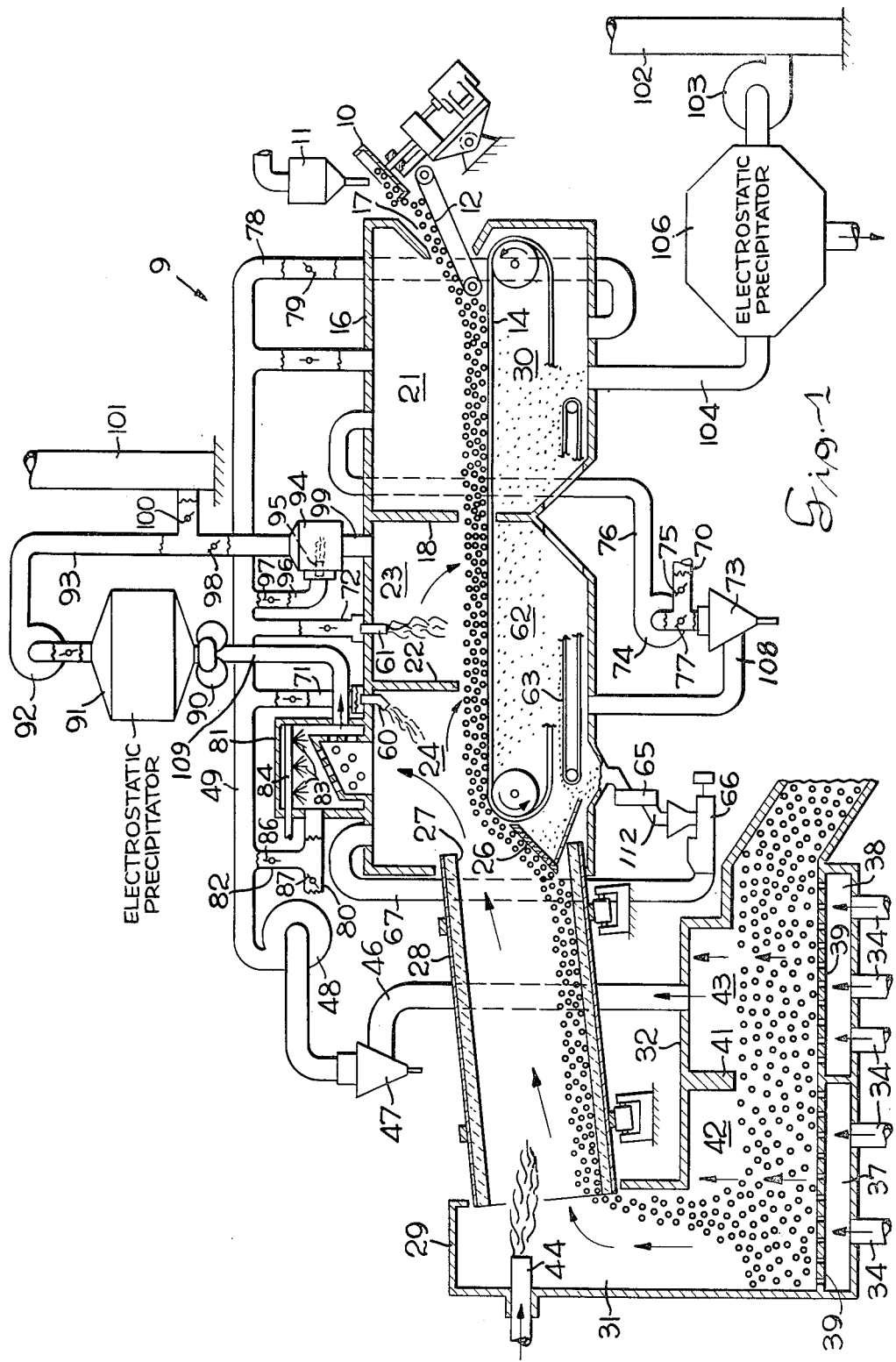
FIG. 1 is a diagrammatical view in side elevation and partly in section of a material treating apparatus for performing the process according to the present invention.

Referring to the figure of the drawing, raw material for the apparatus 9 to be described is supplied by a suitable agglomerating device such as a balling or pelletizing pan 10 or a drum that is fed from a hopper 11. The raw green pellets are deposited on a feeder 12 which feeds the green pellets to a gas pervious traveling grate 14. A housing structure 16 is arranged to enclose a space over the grate 14 and define a material inlet opening 17. A baffle wall 18 is suspended from the roof of housing 16 to a predetermined distance above grate 14 and operates to divide a space enclosed by housing 16 into a preconditioning or drying zone or chamber 21. Another baffle wall 22, suspended from the ceiling of enclosure 16 to a predetermined distance above grate 14, serves to define a first preheat or preburn zone 23 and a second preburn or preheat zone 24. A negative pressure wind box 30 below the preconditioning or dry zone 21 is provided. Green pellets on grate 14 will be transported through the drying zone 21, then through the preburn zones 23 and 24, and then discharged down a chute 26 into an inlet opening 27 of a refractory lined rotary kiln 28.

Rotary kiln 28 slopes downwardly from chute 26 toward a hood 29 that encloses the discharge end of the kiln 28 and defines a passage 31 from kiln 28 to a cooler 32. The downward slope of the rotary kiln 28 causes material received from chute 26 to pass through kiln 28, then into hood 29 and through passage 31 to the cooler 32, which may be a device as shown in U.S. Pat. No. 2,256,017 divided into stages.

The cooler 32 is provided with blowers (not shown) that blow controlled quantities of air, through suitably connected ducts 34 upwardly through wind boxes 37, 38 and then through material on an air pervious grate 39. A baffle 41 may be provided to divide cooler 32 into a first stage or primary cooling zone 42 and a second stage or final cooling zone 43 over grate 39. The cool air supplied is blown upwardly through wind box 37, grate 39, chamber 42, and passage 31 into the firing hood 29. A burner 44 is mounted on and projects into the interior of hood 29 to deliver and burn fuel that raises the temperature of gases passing into kiln 28 to the desired high temperature level required for the difficult high sulfur and high alkali content materials receiving heat treatment in the kiln. Gas flow input from the discharge end of kiln 28 and up chute 26 and into the material preheat zone 24 will be in a temperature range of 1600°–2400° Fahrenheit.

The waste off-gases from the cooler 32 are recouped and utilized in the drying zone 21 and in both of the preheat zones 23 and 24. To this end, the cooler off-gases from the final zone 43 of the cooler 32 are drawn into an exhaust duct 46 which is connected to a mechanical cyclone dust collector 47. A fan 48 connected between the dust collector 47 and a supply duct 49 operates to pass the gases into the supply duct for subsequent utilization.

The kiln off-gases to preheat zone 24 can be very high in sulfur and alkalies with gaseous sulfur exceeding the level that can react with or tie-up with alkalies. In the prior art an excess of gaseous sulfur in the gas from preheat zone 24 was conventionally bypassed to the drying chamber 21 or to the waste gas exhaust; such bypassing presents a problem since present environmental standards prescribe maximum sulfur in waste or stack gases. Thus, an efficient means must be provided to reduce the sulfur in the waste gas prior to these gases being wasted to stack. With the conventional bypass, the potential of the sulfur going through the drying bed in the drying zone 21 and through a waste dust collector is great. Also, when the preheat on-gas contains large amounts of sulfur, a substantial internal sulfur cycle develops which will prevent the desired reduction of sulfur in the kiln product.

To alleviate the sulfur problems, the high sulfur gases to the preheat zone 24 are treated with a material which is chemically reactive with sulfur, such as lime bearing dust. The lime bearing dust can be material collected from wind boxes 30 and 62 under the drying zone 21 and the preheat zones 23 and 24. Included in these collected materials are the pellets and fines which backspill from chute 26.

Sulfur oxides ($SO_2$ and $SO_3$) have a strong affinity for free lime at temperatures generally above 500° and up to 2200° Fahrenheit and readily form gypsum anhydrite ($Ca\ SO_4$). Some of the gypsum anhydrite that is formed is deposited in the calcined material bed and is processed through the kiln 28.

However, some of the gypsum anhydrite passes through the material bed. The high lime bearing material from the wind boxes 30 and 62 is recycled and blown into the kiln off-gas stream to add line bearing fines with which the sulfur in the kiln off-gas will react or combine to form gypsum anhydrite dust and can be removed. To this end, the lime bearing material from the preheat zone 24 and also from the preheat zone 23 and the drying zone 21 which pass through the traveling grate 14 are collected on a lower conveyor 63 and the pellets and fines are passed to a pulverizer 65 and thence to an elevating device, such as a pneumatic pump 66, via connecting duct 112; the duct 112 and pneumatic pump 66, hereinafter referred to as a fourth duct means, and duct 67 are considered as a supply source of lime bearing material. It is to be understood that the duct 67 can be supplied with lime bearing material from another type of source which may be external and independent of the furnace apparatus. The collected and pulverated dust from the pump 66 is directed back to the preheat zone 24 via a first duct 67 and is dropped in a substantially transverse vertical path into the up-sweeping kiln off-gas stream flowing into a bypass mixing box 81. Thus, the recycled dust from the pump 66 has a better potential for being more completely calcined and thus be reactive with the sulfur in the kiln off-gases. A portion of this calcined dust will react with the sulfur oxides in the preheat zone 24 and pass through the material bed on the grate 14 and, with other fines, will be pulled out by the cyclone separator 73 in the form of gypsum anhydrite. A second portion of the calcined dust passes through the mixing box 81.

Gas which is relatively free of sulfur is obtained from the cooler 32 via the connected duct 46. As previously mentioned, this gas is passed through a mechanical dust collector 47 wherein the larger dust particles are removed from the gas. The fan 48 draws the gas from the collector 47 and forces the gas through the duct 49. This relatively sulfur-free gas is passed via duct 71 to burner 60 connected to preburn zone 24 to supply the necessary combustion air to burner 60 which maintains the temperature in the preheating zone 24 to control preheating and calcining of the bed material as well as providing the optimum temperature for effecting the forming of gypsum anhydrite.

Another duct 72 connected between supply duct 49 and burner 61 is connected to preburn zone 23 to supply the necessary combustion air to burner 61 which initiates preheating and calcining of the bed material as well as for effecting the forming of gypsum anhydrite. Still another portion of the sulfur-free gas is utilized in the drying zone 21.

The preheat off-gas that is also delivered to the drying zone 21 might be too hot for the drying zone and thus must be cooled. To this end, bleed-in air from a duct 70 is utilized as tempering air for the relatively hot preheat off-gases. Duct 70 also includes a damper 75 which is operative to permit a controlled flow of tempering air. The wind box off-gases are passed through a cyclone dust collector 73 and thence are passed via a fan 74 and a duct 76 or seventh duct means to the drying zone 21. A regulating damper 77 is operable to control the volume of the wind box off-gases entering the drying zone 21. Thus, the off-gas from preheat zones 23 and 24 entering the drying zone 21 is tempered by ambient air to establish a drying atmosphere of 700° F. or below.

A duct 78, hereinafter referred to as a sixth duct means, connected to the supply duct 49 communicates with the drying wind box 30 under drying zone 21. A damper 79 operates to control the pressure in the supply duct 49 dumping excess gases into the drying wind box 30. This stabilizes the flow of gases through the supply duct 49 and thereby stabilizes the operation of the cooler recoup fan 48. With this arrangement, only the single fan 48 is required to recoup the gases from the cooler 32.

A portion of the kiln off-gas in the preheat zone 24 which contains a substantial amount of reacted and calcined dust from duct 67 is drawn into a ported cage mixing box 81 and mixed with a controlled volume of cooler off-gases from duct 82 or ambient tempering air from duct 80 that are directed into the mixing box. To control the quantity of the cooler off-gases that are directed to the mixing box ducts 46, 49 and 82 as an operative assemblage may be considered as a fifth duct means for supplying tempering air to the mixing box 81 81, a damper 86 is operatively disposed within the duct 82. Duct 80 also includes a damper 87 which is operative to admit a flow of tempering air into the mixing box 81 as required. The mixed gases in the mixing box 81 are moisturized as required by means of sprays 83 which are a part of a water system 84.

The tempered and moisturized mixed gases in the mixing box 81 carry some of the unreacted calcined dust, added via the duct 67, and are mixed in the mixing box 81. This dust is substantially free lime. Since sulfur oxides ($SO_2$ and $SO_3$) have a strong affinity for free lime at temperatures between 500° and 2200° Fahrenheit, they react with the dust in the mixed gases in the mixing box 81 and form gypsum anhydrite which is a potential usable by-product. Thus, the gases from the mixing box 81 are passed through a mechanical cyclone dust collector 90, via a second duct means 109 where the coarser gypsum anhydrite dust particles are collected and thence through an electrostatic or permeable bag precipitator 91 wherein the finer dust particles are collected from the gas.

The relatively clean gases are drawn from the electrostatic precipitator 91 by a fan 92 and directed into an air heater 94 via an interconnecting duct 93. Within the air heater 94 the gases from the mixing box 81 are reheated. A controlled quantity of cooler off-gases obtained from the supply duct 49 via an interconnecting duct 96 are supplied as relatively sulfur-free combustion air to the air heater burner 95. The quantity of the cooler off-gases that are supplied to the air heater 94 is controlled by a damper 97. The volume of the bypass gases to the air heater 94 is controlled by a damper 98. Thus, the temperature of the mixture of bypass mixing box gases is raised to a suitable level before it is passed via a duct 99 to the preheat zone 23. The assemblage of ducts 93 and 99 are considered as a third duct means by which the cleansed tempered gases are passed to the preheat chamber.

The bypass gases, when not utilized in the preheat zone 23, is directed to the stack 101. This is accomplished by opening damper 100 and closing damper 98. On the other hand, the gases in the negative pressure wind box side 30 of the drying zone 21 are waste gases which are disposed of through a stack 102. A fan 103 draws these waste gases through a duct 104 and an electrostatic precipitator 106.

FIG. 2 illustrates a modification of apparatus for practicing the process herein disclosed. The apparatus disclosed is generally similar to that of FIG. 1 and includes the feeder 12 which deposits the green pellets on the gas pervious traveling grate 14. The housing structure 16 encloses a space over the grate 14 and defines the material inlet opening 17. The baffle wall 18 operates to divide the space enclosed by the housing 16 into a preconditioning or drying zone 21 and a dual preheat zone 23 and 24. The preheat zones 23 and 24 are separated from each other by the baffle wall 22. As in the case of the apparatus of FIG. 1, the baffle wall 22 extends downwardly a distance just sufficient to allow the bed of material moving with the grate 14 to clear the lower end of the wall 22. The baffle wall 22 serves to maintain a separation of the gases in the zones 23 and 24. That is, the high sulfur gases flowing from the kiln into preheat zone 24 are maintained separated from the relatively low sulfur gases in preheat zone 23. The cooler recoup gases to the supply duct 49 are utilized in the drying zone 21 and preheat zones 23 and 24 in the manner previously described for the system 9.

The system 110 varies from the system 9 in that the wind box 162 is constructed and arranged to extend rightwardly, as viewed in FIG. 2, to include a portion of the drying zone 21. Thus, the waste gases drawn out of the wind box 162 will also include a portion of the relatively sulfur-free waste gases from the drying zone 21. In addition, the portion of the waste gases from the drying zone 21 will be at a temperature which is substantially lower than the temperature of the drying gases. Thus, this relatively low temperature substantially sulfur-free gas will serve to temper the off-gases from the preheat zones 23 and 24. This blend of off-gas at a suitable temperature is directed back through duct 76 to the drying zone 21 and reused.

A further modification which can be usefully employed with either the system of FIG. 1 or the system of FIG. 2 relates to the manner in which the reclaimed dust from the pneumatic pump 66 can be introduced into the kiln off-gases. As shown in FIG. 2, a duct 167, in lieu of duct 67, is connected to direct dust from the elevating pump 66 into the preheat zone 24. The duct 167 is connected to the housing 16 and communicates with the interior of the preheat zone 24 from the end of the housing 16. In this manner, the dust is introduced into kiln off-gas in a direction with the stream flow.

FIG. 3 depicts still another modification of introducing the dust from the pneumatic elevating pump 66 into the kiln off-gases. In this case, a duct 267 is connected to the pump 66 and the side of the housing 16 to thereby effect the introduction of the reclaimed dust into the kiln off-gas stream at an angle to gas stream flow. This has an advantage of exposing additional kiln off-gases not bypassed to the treatment dust.

FIG. 4 depicts a further modification of introducing the dust from the pneumatic pump 66 into the kiln off-gas stream. As shown in FIG. 4, a duct 367 connects the pump 66 to the side of the mixing box 81. Thus, the waste dust is introduced into the kiln off-gas as it mixes with recouped gases from the cooler 32. This arrangement provides the advantage of exposing only the bypassed kiln off-gases to the treatment dust.

The systems set forth in detail above are well adapted to utilizing nonmarketable waste dust which has a relatively high sulfur content as an additive to the raw material being fed to the balling device such as a pelletizer pan. The addition of the high alkali waste dust increases the abrasion resistivity of the wet pellets. This substantially reduces the breakage or shattering of the pellets, reduces dusting and generally increases the overall pellet quantity.

Figure 5:
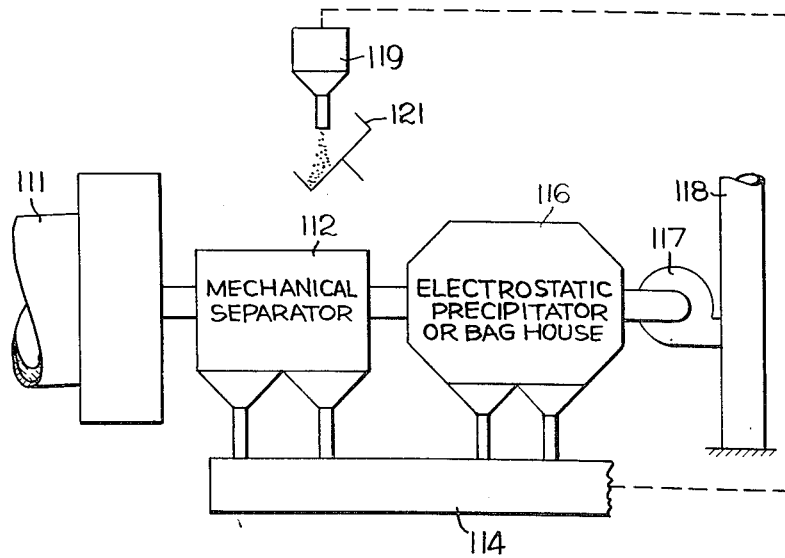
FIG. 5 is a diagrammatical view showing a source of waste dust that is usable in the apparatus shown.

In FIG. 5, waste gas from a source such as a rotary kiln 111 is passed to a mechanical separator 112. The separator 112 separates the larger dust particles from the gas with the larger dust particles being deposited in an elevating and feeding device. The cleaned waste gas passes from the mechanical separator 112 to an electrostatic precipitator or bag house 116. The fine dust particles removed from the waste gas are fed to the conveyor device 114 where it mixes with the coarser dust particles from the mechanical separator 112. The cleansed waste gases are drawn from the precipitator 116 by a fan 117 and passed to a waste stack 118.

The combined waste dust particles are fed to a hopper 119 and thence to balling device such as a pelletizer pan 121 which is similar to the pans associated with the systems depicted in FIGS. 1 and 2. The waste dust is moisturized in the pan and formed into green pellets which are processed through the systems of either FIG. 1 or FIG. 2.

Figure 6:
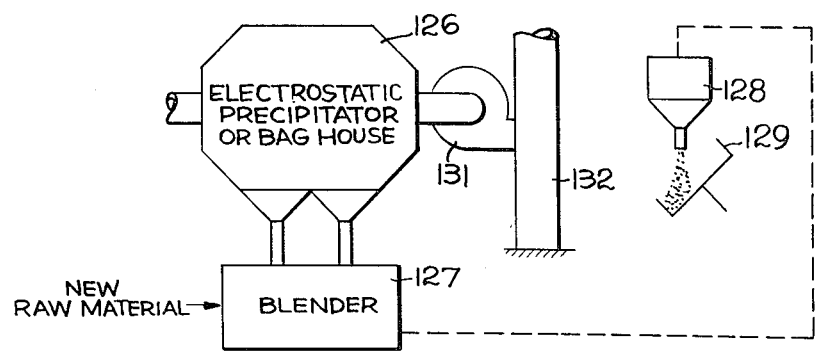
FIG. 6 is a diagrammatical showing of another source of waste dust usable in the apparatus.

In FIG. 6, another method of utilizing waste gas dust as system material is shown. Waste dust from an electrostatic precipitator or bag house 116 is fed to a blender 127 and mixed with new raw material to be processed. The blend of waste dust and new raw material is delivered to a hopper 128 and thence fed to the pelletizer pan 129 and formed into raw green pellets for processing through the systems. The cleansed waste gases are drawn from the precipitator 126 by operation of a fan 131 and passed to a stack 132.

Figure 7:
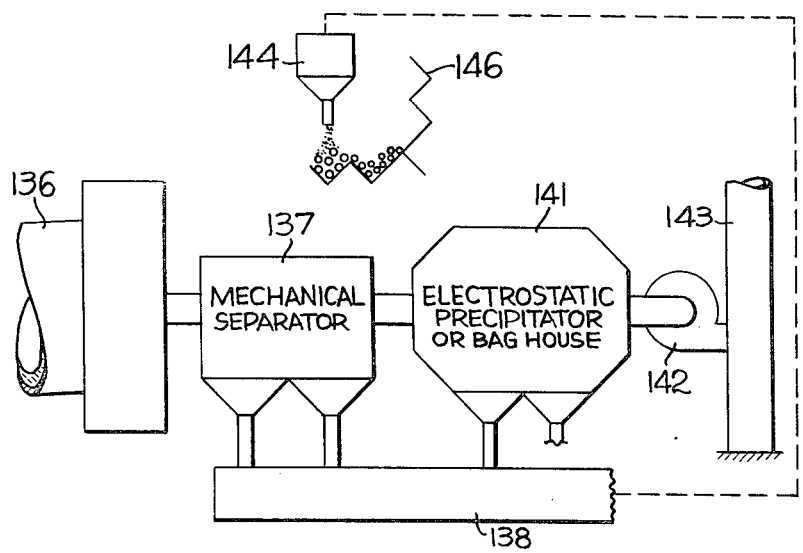
FIG. 7 is a diagrammatical showing of still another source of waste dust usable in the apparatus.

FIG. 7 illustrates still another method of utilizing waste dust having a relatively high alkali and sulfur content. As shown, the waste dust is obtained from a source, either a storage pile or a kiln 136. The waste gas and dust is drawn into a mechanical separator 137 where the coarse dust particles are separated out. These coarse dust particles are funneled to a conveyor 138. The waste gases are passed from the mechanical separator 137 to an electrostatic precipitator 141 wherein the waste gases are cleansed of fine dust particles. The fine dust particles are passed to the conveyor 138 combining with the larger dust particles from the mechanical separator. The conveyor 138 operates to deliver the collected dust to a hopper 144. The collected waste dust from the hopper 144 is fed to the outer stage of a two stage pelletizer 146 where it is utilized to coat the green raw pellets formed in the inner stage of the pelletizer 146. Waste gases are passed to the waste stack 143 by operation of a fan 142.

The embodiments of the invention in which an exclusive property or privilege is claimed are defined as follows:

1. In a material heat-treating furnace apparatus (9) having structure defining a drying chamber (21) for receiving a cement material to be treated and for preconditioning the material, and at least one preheat chamber (23-24) for receiving material from the drying chamber (21), a travelling grate (14) mounted within the structure for conveying the material successively through the respective chambers, a first windbox (30) located beneath the travelling grate (14) in the drying chamber (21), a second windbox (62) located beneath the travelling grate in the preheat chamber (23-24), a kiln (28) mounted to receive material directly from the preheat chamber (23-24), and at least one cooling chamber (43) disposed to receive material from the kiln, the drying and preheat chambers, the kiln, and the cooling chamber being connected in a series flow arrangement to define a material flow path from the drying chamber to the cooling chamber, a fan system means (74) including a first dust collector means (73) for withdrawing gases from the second windbox (62) and passing them to the drying chamber (21), and gas-conveying means for directing usable gases developed within the apparatus into various zones of the apparatus, comprising:

means (81-91-93-98-99) for directing off-gases from the kiln (28) into the preheat chamber (23-24);

a supply source (63) of lime-bearing material which is chemically reactive with sulfur;

a first duct (67) means connected between said supply source of a lime-bearing material which is chemically reactive with sulfur and the preheat chamber (23-24);

a mixing device (81) connected to the preheat chamber (23-24) for receiving kiln off-gases which have been treated with the lime-bearing material;

an air supply (82) connected to said mixing device (81) for mixing air with the treated kiln off-gases to temper said kiln off-gases;

a second duct means (109) connected to said mixing device (81);

a second dust collector means (90-91) connected to said mixing device (81) and to the preheat chamber (23-24) for the removal of solid sulfur compound dust particles from the tempered mixed gases prior to said tempered mixed gases being supplied to the preheat chamber; and, a third duct means (93-99) connected between said second dust collector means (90-91) and the preheat chamber for passing cleansed tempered mixed gases back through the material in the preheat chamber.

2. A material heat-treating furnace apparatus, according to claim 1, including a collector conveyor (63) operatively arranged in the second windbox for collecting the lime-bearing material which is chemically reactive with sulfur that has passed through the material on the grate in the preheat chamber, and a fourth duct means (112-66) connected between said second windbox and said first duct arrangement 67 and forming the supply source of lime-bearing material which is chemically reactive with sulfur.

3. A material heat-treating furnace apparatus according to claim 2, including as pulverizer (65) in said fourth duct means (112).

4. A material heat-treating furnace apparatus according to claim 1 wherein said first duct means (67) is operatively connected between the preheat chamber (23-24) and said supply source of lime-bearing material in a manner such that the lime-bearing material which is chemically reactive with sulfur is fed into the preheat chamber in a substantially downward direction so as to be substantially transverse to the flow of kiln off-gases as they enter the preheat chamber from the kiln.

5. A material heat-treating furnace apparatus according to claim 1 wherein said first duct means (67) is operatively connected between the preheat chamber and said supply source of lime-bearing material in a manner such that the lime-bearing material which is chemically reactive with sulfur is fed into the preheat chamber in a direction which is substantially parallel to the flow of kiln off-gases into the preheat chamber from the kiln.

6. A material heat-treating furnace apparatus according to claim 1, including a fifth duct means (46-49-82) connected between the cooling chamber (43) and the mixing device (81) for supplying tempering air obtained from heated air which has passed through the cooler.

7. A material heat-treating furnace apparatus according to claim 1, including controlled-air inlet means (80) in the mixing device (81) for supplying ambient air thereto.

8. A material heat-treating furnace apparatus according to claim 1, including a water supply means (84) connected within the mixing device for supplying moisturizing water to the mixing device.

9. A material heat-treating furnace apparatus according to claim 1, including a heater (94) in said third duct arrangement (93-99) for heating the cleansed gases prior to their entry into the preheat chamber (23-24).

10. A material heat-treating furnace apparatus according to claim 9 wherein said heater (94) is connected to the fifth duct means (49-96) so as to receive cooling chamber off-gases as combustion air for said heater.

11. A material heat-treating furnace apparatus according to claim 1 wherein the preheat chamber is divided into first (23) and second (24) preheating chambers by a depending partition which extends transversely to the direction of travel of the grate therethrough, and the first duct means (67) for the supply of the lime-bearing material which is chemically reactive with sulfur is connected to the second preheating chamber (24).

12. A material heat-treating furnace apparatus according to claim 2 wherein said collector conveyor (63) in the second windbox (62) beneath the preheat chamber (23-24) extends into the first windbox (30) beneath the travelling grate (14) in the drying chamber (21).

13. A material heat-treating furnace apparatus according to claim 1, including a sixth duct means (78) connected to the fifth duct means (46-49) for passing cooling chamber off-gases into said first windbox (30) beneath the travelling grate in the drying chamber to stabilize the flow of gases in said fifth duct means (49).

14. A material heat-treating furnace apparatus according to claim 1 wherein said second windbox (162) (FIG. 2) beneath the preheat chamber (23-24) extends partly under the drying chamber (21) (FIG. 2) so that a portion of relatively sulfur-free gases from the drying chamber (21) are drawn by suction into the second windbox (162) to be mixed therein with gases from the preheat chamber, and a seventh duct means (76) is connected between the second windbox fan (74) and the drying chamber (21) for the recirculation of the mixed gases back to the drying chamber so as to supply drying heat to said drying chamber (21).

15. A material heat-treating furnace apparatus according to claim 1 wherein said first duct means (267) is operatively connected between the preheat chamber (23-24) through the side of the furnace apparatus and said supply source of lime-bearing material in a manner that the lime-bearing material which is chemically reactive with sulfur is fed into the preheat chamber from the side of the furnace apparatus in a direction which is substantially transverse to the flow of kiln off-gases into the preheat chamber.

16. A material heat-treating furnace apparatus according to claim 1 wherein said first duct means (367) is operatively connected between the preheat chamber and said mixing device (81) in a manner that the lime-bearing material which is chemically reactive with sulfur is fed into the mixing device (81) to mix with the kiln off-gases and tempering air from the cooler.

* * * * *